July 29, 1958          A. S. KROTZ          2,845,280

HYDRAULICALLY INTERCONNECTED SPRING SUSPENSION SYSTEM

Filed Sept. 27, 1955          3 Sheets-Sheet 2

INVENTOR.
ALVIN S. KROTZ
BY
John D. Henley
ATTY.

July 29, 1958 A. S. KROTZ 2,845,280
HYDRAULICALLY INTERCONNECTED SPRING SUSPENSION SYSTEM
Filed Sept. 27, 1955 3 Sheets-Sheet 3
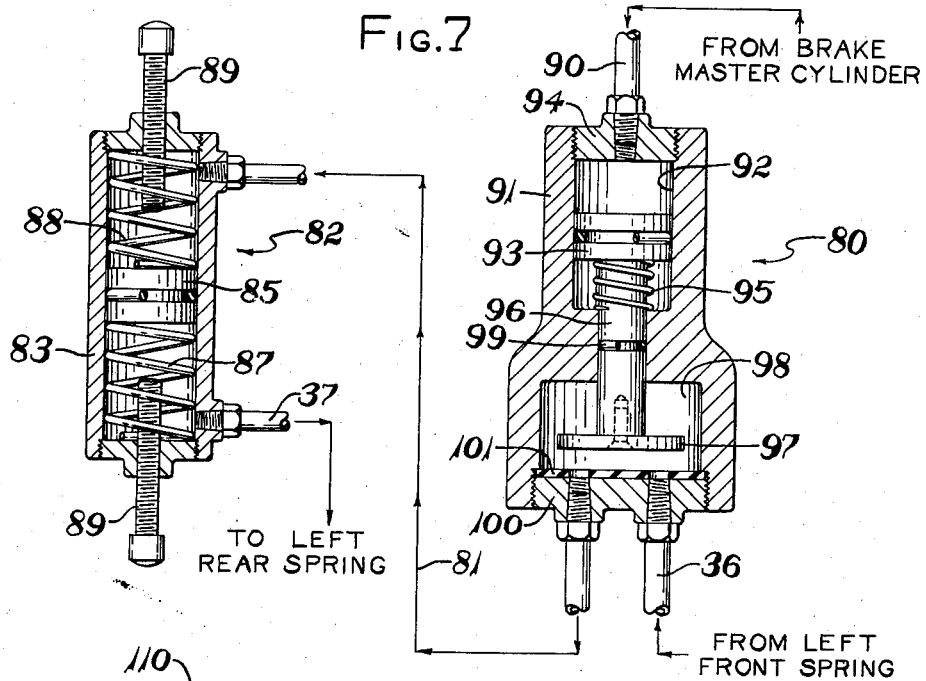
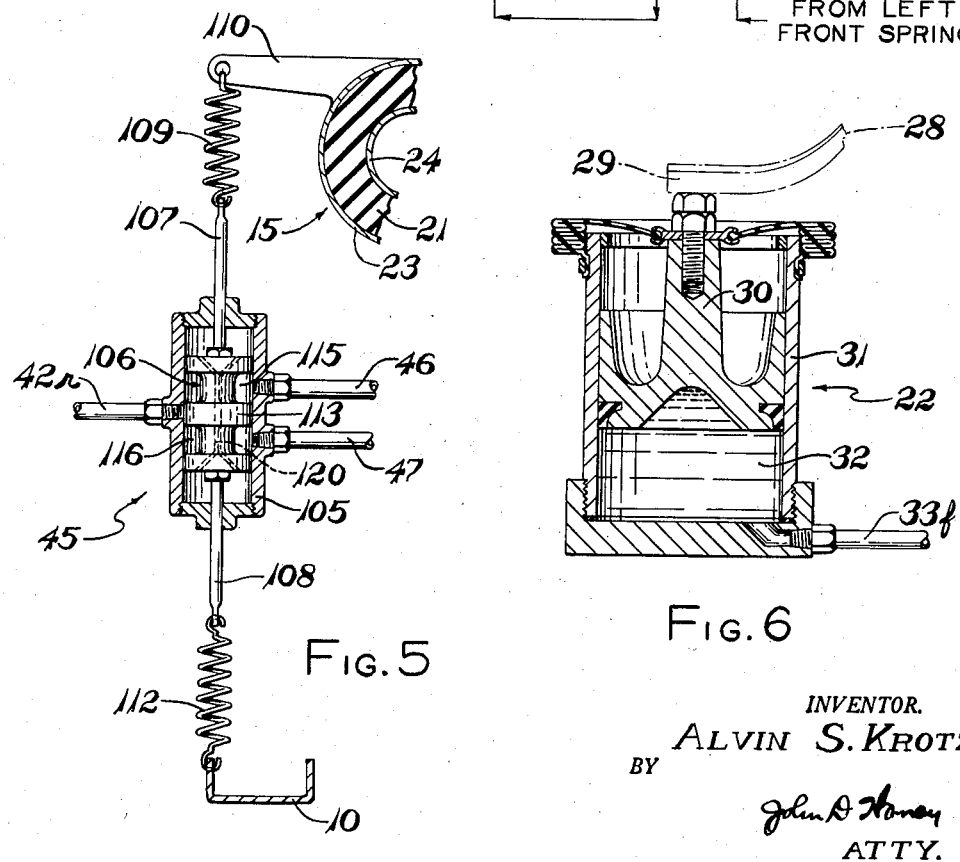
INVENTOR.
ALVIN S. KROTZ
BY
John D. Honey
ATTY.

United States Patent Office 2,845,280
Patented July 29, 1958

2,845,280

HYDRAULICALLY INTERCONNECTED SPRING SUSPENSION SYSTEM

Alvin S. Krotz, Akron, Ohio, assignor to The B. F. Goodrich Company, New York, N. Y., a corporation of New York Application September 27, 1955, Serial No. 536,997

13 Claims. (Cl. 280—104)

This invention relates to a spring suspension system applicable to passenger automobiles, trucks, buses, trailers, railway cars and other vehicles. The system of this invention materially enhances the riding characteristics of a vehicle in that it minimizes swaying and longitudinal pitching, thereby rendering the vehicle more comfortable to ride in and safe to operate.

In general, this invention provides a suspension system in which the main springs of two or more road wheels are interconnected by hydraulic circuits in a manner so that when any one of the wheels is displaced relative to the frame by road shocks or the like, forces tending to maintain the frame level are simultaneously imposed on the portions of the frame adjacent the interconnected springs. The interconnecting hydraulic circuits are preferably arranged so that the normal or static load carried on each wheel of the vehicle is distributed between the wheel spring and the hydraulic fluid contained in the interconnecting circuits. Thereafter when a further load is imparted to one of the wheels during driving, a proportion of this additional load deflects the spring of the loaded wheel and another proportion is communicated through the interconnecting circuits to deflect the spring of an interconnected wheel in the opposite direction, thereby imparting the desired leveling forces to the portions of the frame adjacent the latter spring. Accordingly springs having a softer spring rate than would be normally required may be employed for the vehicle thereby enhancing its riding characteristics.

Interconnecting the main springs of a vehicle normally augments the tendency for the vehicle body to develop a pitching motion relative to its wheels. A "pitching" motion as used herein refers to an oscillation or rocking of the vehicle body relative to the wheels about a horizontal axis transverse to the longitudinal axis of the vehicle and intermediate the wheels of the vehicle. In accordance with this invention means is provided in the interconnecting circuits for elastically restraining or resisting the forces communicated through the circuits tending to induce a pitching motion in the body. The elastic restraining means advantageously isolates the body or frame of the vehicle from the effects of pitch-inducing forces in that such forces are restrained before being communicated to the body to preclude the development of any substantial pitching motion. The system further provides for regulating the proportions of the forces communicated through the interconnecting circuits so that, in effect, the main springs may be adjusted for stiffer or softer operation within the design limits to suit the particular existing driving conditions and the desires of the vehicle operator. In a preferred embodiment of the invention, hereinafter described, the springs may be rendered substantially stiffer synchronously with the application of the brakes of the vehicle to minimize the tendency for the front of the vehicle to dip or duck when the vehicle is brought to a stop.

The system further includes mechanism for sensing a material change in the normal elevation of the body or frame relative to the wheel axles when the static sprung weight of the vehicle is materially changed and for automatically restoring the frame to the desired elevation.

The hydraulic interconnecting circuits are preferably interposed between a spring of a front wheel of the vehicle and one or more rear wheel springs. They are particularly sensitive to disturbing forces imparted to the wheels or to the frame in functioning in the foregoing manner. They occupy comparatively little space on the vehicle and may be maintained inexpensively. Moreover, a failure of one or more of the hydraulic interconnecting circuits does not render the vehicle springs inoperative.

The invention will be further described with reference to the accompanying drawings which are partially diagrammatic and which illustrate, by way of example, a suspension system constructed in accordance with and embodying this invention.

Figure 1:
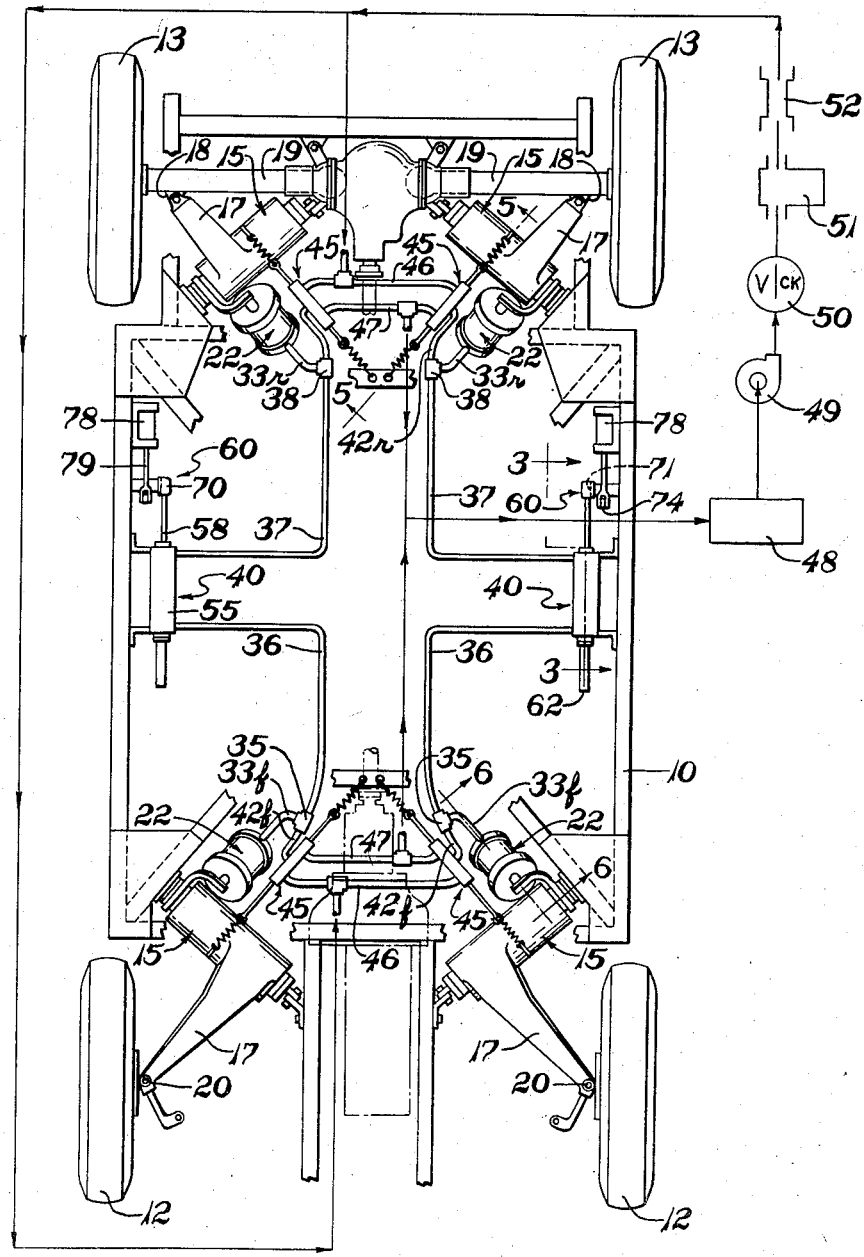
Fig. 1 is a plan view of a vehicle chassis with front and rear springs hydraulically interconnected.

Figs. 5 and 6 are longitudinal sectional views taken on the lines 5—5 and 6—6, respectively, of Fig. 1; and Fig. 7 shows alternate means of elastically restraining pitching of the vehicle frame and varying the stiffness of the vehicle springs.

Referring to Fig. 1, the vehicle chassis to which a suspension system of this invention is applied includes a frame 10, front wheels 12, rear wheels 13, and rubber torsion springs 15 mounted diagonally of the corners of the frame, here illustrated at about 45° to the central longitudinal axis of the frame in a manner described in detail and claimed in my U. S. Patent No. 2,555,649, of June 5, 1951. Each rear wheel 13 is independently sprung by its respective rubber torsion spring 15 through an operating arm 17 which extends outward from spring 15 to a mounting lug 18 near the wheel at the outer end of the rear axles 19. The corresponding operating arm 17 of each front wheel spring 15 is pivotally connected to a king pin 20 of its respective front wheel.

Figure 2:
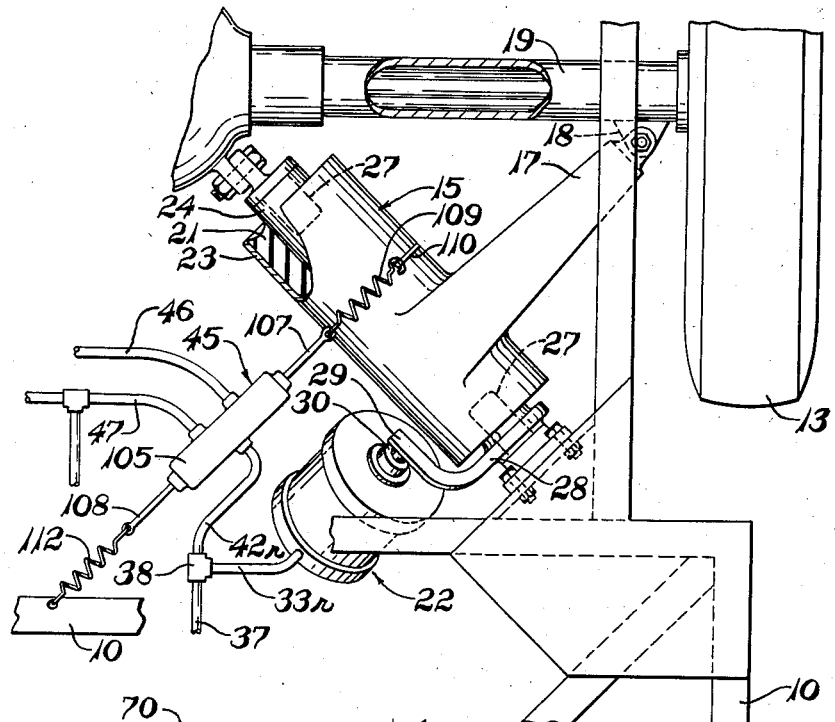
Fig. 2 is an enlarged plan view of one of the rear corners of the chassis of Fig. 1 showing details of the spring mounting.

The static load of the vehicle body is normally supported relative to the wheels by torsional distortion of the rubber sleeves 21 (see Fig. 2) of the torsion springs 15 and by hydraulic fluid contained in spring-reaction cylinders 22 associated with the springs. As shown in Fig. 2, the rubber sleeve 21 of each spring is interposed between an outer shell 23 and an inner hollow shaft 24, the ends of which are rotatably supported on coaxial stub shafts 27. The cylinder 22 is operatively connected with its respective spring 15 by a lever arm 28 which is rigidly secured to the inner shaft 24 and which projects outwardly from shaft 24 and terminates in a foot portion 29 engaged with the top of a piston 30 (see Fig. 6) within the casing 31 of cylinder 22. The lever arm 28 is operable to depress piston 30 against a volume of hydraulic fluid in a fluid chamber 32 below the piston in casing 31 and thereby oppose rotation of the shaft 24 on its supporting stub shafts 27 in response to vertical displacement of the wheel. The fluid chamber 32 in casing 31 is in communication with a conduit 33 which, as is subsequently explained, is interconnected with a corresponding fluid chamber of a cylinder 22 associated with a spring 15 at the opposite end of the chassis.

Figure 3:
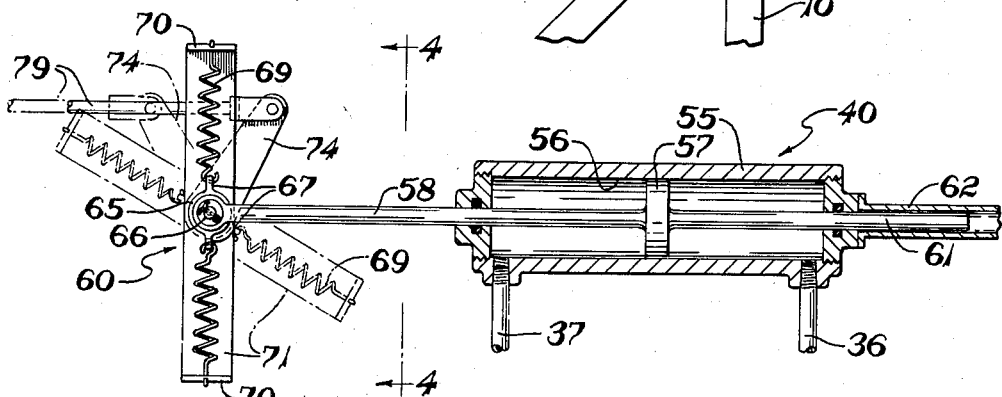
Fig. 3 is a view taken along the line 3—3 of Fig. 1.
Figure 4:
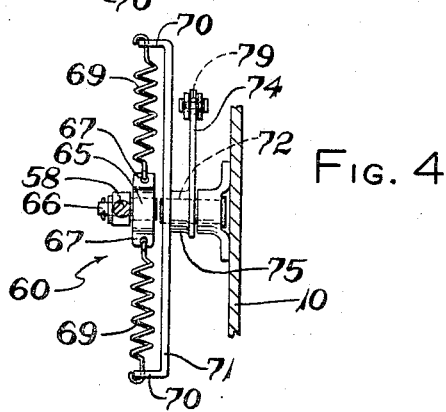
Fig. 4 is a view taken along the line 4—4 of Fig. 3.

The interconnecting circuits are best shown in Fig. 1 and, in the illustrated embodiment, the left front and left rear springs 15 are interconnected for operation separately from identical circuits between the right front and right rear springs. ("Left" and "right" refer to the front of the vehicle and its forward direction of travel.) Referring to Fig. 1, conduit 33f leads rearwardly from its cylinder 22 at the left front spring 15 to a T-fitting 35 where it is joined to a main conduit 36 leading to an elastic restraining mechanism 40, the structure of which is shown in Figs. 3 and 4. From the mechanism 40 another main conduit 37 leads rearwardly to a T-fitting 38 to which is connected conduit 33r from cylinder 22 of the left rear spring 15. Branching from the T-fittings 35 and 38, respectively, is a conduit 42f and a conduit 42r, each leading to a valve mechanism 45 to sense the elevation of the frame of the vehicle relative to the rotational axis of the wheel suspended from each spring. Each of the elevation-sensing mechanisms 45 is in turn connected to a high pressure fluid supply line 46 and a low pressure exhaust line 47. The right front and right rear springs are interconnected by circuits identical to those between the left springs and although the subsequent description of the mode of operation of these circuits will be directed primarily to the left wheel circuit, it will be understood that the right wheel circuits will function in an identical manner.

The preferred equipment for circulating fluid to the foregoing hydraulic circuits is shown diagrammatically in Fig. 1 and includes a reservoir 48 for collecting the low pressure fluid exhausted from conduits 47, a pump 49 taking suction from the reservoir and delivering the fluid at materially higher pressure through a check valve 50 to an accumulator 51. Normally the check valve 50 will be integral with the pump 49 and the pump may be driven from the engine of the vehicle or from a suitable electric motor or the like. From the accumulator 51 high pressure fluid flows through a pressure regulator valve 52 into the high pressure supply lines 46 at the front and at the rear of the chassis. The supply lines 46 maintain the interconnecting circuits including the cylinders 22 at all times full of hydraulic fluid and at a pressure adequate to support the static load of frame 10 and the vehicle body at a particular design elevation relative to the wheels.

In the operation of the vehicle, when the left front wheel strikes a road obstruction causing the wheel to be displaced diametrically upward relative to the frame, torsional distortion is imparted to the rubber body 21 of the left front spring 15 and, simultaneously, the inner shaft 24 of the left front spring tends to rotate upon its supporting stub shafts 27 to urge lever arm 28 of the spring against its piston 30 in the cylinder 22 at the left front spring. The resulting added pressure on the piston 30 moves the piston and displaces some hydraulic fluid through conduit 33f and conduit 36 toward the elastic restraining mechanism 40. Mechanism 40 in turn functions to transmit a proportion of the increased pressure to the fluid in conduit 37 through which it is communicated by conduit 33r to the left rear cylinder 22, thereby urging the piston 30 of the left rear cylinder 22 upwardly. This motion of the latter piston exerts a "jacking" or leveling effect on the left rear corner of the frame in that lever arm 28 of the left rear spring is swung upwardly by piston 30 to rotate the inner shaft 24 of the left rear spring thereby tending to deflect the left rear spring oppositely to the deflection of the left front spring. That is to say, the resulting torsional distortion of rubber sleeve 21 tends to swing spring arm 17 downwardly and the reaction of the latter force exerted by arm 17 tends to elevate the left rear corner of the frame. Inasmuch as this upward force imparted to the left rear corner of the frame is transmitted hydraulically from the front of the chassis, the upward rear force is applied substantially simultaneously with the initial upward force on the front of the frame caused by the road obstruction.

If the left rear wheel strikes the same obstruction, the foregoing events occur in reverse order so that an upward jacking force is exerted on the left front corner of the frame substantially simultaneously with the vertical displacement of the rear wheel and the corresponding upward force on the left rear corner. In each case the upward force exerted at one end of the frame is proportional to the counter force transmitted to the opposite end of the frame and each of these forces is materially less than the force which would be applied wholly to one end of the frame if the system were not present. The right wheels function through their respective hydraulic interconnecting circuits in the same way as that described for the left wheels, so that in the frequent case where both front wheels strike a common obstruction simultaneously, and moments later both rear wheels strike the same obstruction, the frame of the vehicle will remain substantially level as the vehicle clears the obstruction.

The elevation-sensing mechanisms 45 of the several springs are designed to remain inactive during a momentary change in elevation between the frame and the wheels such as a change caused by the wheels striking a road obstruction, and operate only to adjust the elevation of the frame when the static mass of the vehicle on the springs is materially changed.

Owing principally to the distribution of shock forces between front and rear of the frame provided by this suspension system, appreciably softer spring action will result in a particular vehicle as compared with the spring action for present conventional suspension mechanisms. However, interconnecting the main springs for simultaneous operation may make a vehicle particularly susceptible to pitching motions as a result of jolts or shock loads applied to the wheels such as may occur when a vehicle is traveling on the road and motion of this type may render a vehicle completely unstable and very difficult to steer in addition to being decidedly discomforting to the occupants of the vehicle.

In the system of this invention the occurrence of an objectionable pitching motion in the vehicle body is minimized and for all practical purposes eliminated by the inclusion of an elastic restraining mechanism 40 in each of the interconnecting circuits. Structurally, each of these mechanisms 40 in the illustrated embodiment includes (see Fig. 3) a casing 55 having a central cylindrical bore 56 with a single central piston 57 slidable axially of the bore. A piston rod 58 extends from piston 57 coaxially through the casing 55 and through the end wall thereof and its outer end is engaged with an adjustable spring mechanism 60 which may be adjusted to offer varying degrees of resistance to axial movements of the piston 57 within the casing. The piston 57 is further provided with a guide rod 61 extending axially through the casing opposite the piston rod 58 and through the casing end wall into a protective tube 62 which slidably receives the end of guide rod 61. Preferably the opposite sides of piston 57 are of equal area. Normally the casing 55 on opposite sides of piston 57 is full of hydraulic fluid, the portions of the casing on opposite sides of the piston respectively communicating with the main conduits 36 and 37.

The spring mechanism 60 includes a collar 65 freely rotatable on a short stub shaft 66 (see Fig. 4) secured to the outer end of piston rod 58. On two diametrically opposite sides of collar 65 there are outwardly projecting lugs 67 to each of which is fastened one end of one of a pair of coil springs 69. Each of these springs is stretched from its respective lug 67 to an adjacent leg 70 of a rigid yoke 71 which embraces the collar so that the springs 69 exert diametrically opposite forces on the collar 65 and piston rod 58. The yoke 71 is swivelly supported intermediate its legs 70 on a spindle 72 which is secured at adjacent portion of the frame. It may be noted in Fig. 4 that spindle 72 is coaxial with stub shaft 65 but independent of the latter. The yoke 71 may be rotated on its spindle 72 by a lever 74 which is also journaled on the spindle 72 and rigidly secured to the central portion of yoke 71 by a spacer 75.

Under normal operating conditions the yoke is preferably disposed in the vertical position shown in Fig. 3 so that its springs 69 are oriented on an axis perpendicular to the piston rod 58. In this position, the springs offer their minimum resistance to reciprocating movements of piston rod 58 and provide comparatively little opposition to short strokes of the piston rod, although they provide a definite restraining force on the piston rod 58 and appreciable resistance to long strokes of the rod. Accordingly, when hydraulic fluid is displaced through main conduit 36 into the right portion of the casing 55 such as when the left front wheel of the vehicle is displaced by a road obstruction, piston 57 is shifted leftward against the resistance of springs 69 to displace a proportional volume into conduit 37. The action of the springs is the same for rightward movements of the piston 57. If appropriate conditions exist to induce a pitching motion in the vehicle, the initial phases of this motion will be normally accompanied by high pressure reverse surges of the hydraulic fluid in the interconnecting circuits against opposite sides of piston 57. Since the force of such surges at the onset of them is immediately restrained by the elasticity of springs 69, the development of any substantial pitching motion in the vehicle body is automatically precluded.

From the foregoing description of the hydraulic circuits it is evident that when a shock load of any given magnitude is imparted to one wheel, a proportion of this load is utilized to impose additional torsional distortion of the rubber sleeve 21 of the spring of the loaded wheel and another proportion of this load is transmitted through the hydraulic circuits to the opposite end of the frame. The maximum load which may be transmitted to the opposite end of the frame by the hydraulic interconnecting circuits for a system of a particular size occurs when the yoke 71 is oriented in its vertical position in Fig. 3, since in this position the springs 69 offer a minimum resistance to short movements of the piston rod 58. The proportion of the load transmitted to the opposite end of the frame may be diminished by increasing the resistance of the springs 69 to reciprocating movements of the piston rod 58 and in this embodiment of the invention, this is accomplished by rotating the yoke to various angles coplanar with but away from the vertical position of Fig. 3. Hence, with the yoke oriented in the chain-dotted position in Fig. 3, the springs 69 obviously impose a greater resistance to reciprocating movements of the piston rod 58 so that the rubber sleeve 21 of the spring 15 is distorted a greater amount by the disturbing force on its wheel than when the yoke 71 is vertical. Therefore progressively adjusting the position of the yoke 71 from the vertical position of Fig. 3 toward a horizontal position results in the introduction into the circuit of a progressively increasing resistance to the communication of forces through the circuits so that in effect, the main wheel springs 15 are made progressively stiffer, i. e., the springs 15 approach the spring rate at which they would normally function if the hydraulic circuits were disconnected. The ability to change the effective spring rate of the springs 15 in the foregoing manner is of particular advantage in that the spring rate of the main wheel springs 15 may be regulated at will to suit the particular operating conditions of the vehicle or the desires of the operator of the vehicle. It is also advantageous in that it provides an opportunity to stiffen the springs as the vehicle is braked, thereby overcoming the tendency of the front of the vehicle to "duck" when the brakes are applied in stopping.

In the preferred embodiment illustrated in Fig. 1, the yoke 71 is automatically adjustable to stiffen the main springs 15 each time the brakes of the vehicle are applied by means of a hydraulic cylinder 78 (Fig. 1) mounted on the frame 10 and having its piston rod 79 (Fig. 3) connected to the operating lever 74 of yoke 71. The cylinder 78 may be interconnected with the brake hydraulic system master cylinder (not shown) to operate the cylinder so that the yoke 71 is shifted toward a horizontal position as the brakes of the vehicle are energized. Alternatively, the operating lever 74 of yoke 71 may be operated manually by a suitable linkage (not shown) terminating inside the vehicle adjacent its operator, or a combination of manual and automatic controls associated with the brake system may be used.

Fig. 7 shows an alternate means of elastically restraining pitching motions and adjusting the stiffness of the springs 15 which may be employed in the interconnecting hydraulic circuits between the springs 15 in lieu of the elastic restraining means 40 of Fig. 1. The mechanism illustrated in Fig. 7 differs in general from that of Fig. 3 in that in the mechanism of Fig. 7, regulation of the stiffness of the springs 15 is accomplished by impeding the flow of fluid between the cylinders 22 of the springs 15 when a load is imposed on one of the wheels. This mechanism includes a flow-regulator valve 80 here illustrated connected to line 36 from the cylinder 22 of the left front wheel and which is normally open so that fluid may flow through this valve and through a connecting line 81 to a cylinder 82. The latter cylinder is connected to the main conduit 37 and includes a casing 83 having a single central piston 85 slidable axially in the bore of the casing and the movement of which is opposed by compressed coil springs 87 and 88 inside the casing acting on opposite sides of piston 85. The casing on opposite sides of piston 85 is maintained full of hydraulic fluid and, accordingly, the piston 85 is movable axially of the casing against either the spring 87 or the spring 88 in response to an increase in pressure in main conduits 36 or 37. These springs function similarly to the springs 69 of Fig. 3 in elastically restraining oscillations of the piston 85 to preclude the development of any substantial pitching motion of the vehicle body. The casing 83 further includes adjustable stops 89 threaded through the end walls of the casing to limit axial movement of the piston 85.

The flow-regulator valve 80 as shown in Fig. 7 may be secured rigidly to the frame 10 and is operated by hydraulic fluid supplied through a conduit 90 from the brake system of the vehicle to automatically restrict or impede the flow of fluid to the cylinder 82 when the brakes are applied, thereby in effect stiffening the spring rate of main springs 15 so that the vehicle has appreciable resistance to ducking. The valve 80 comprises a casing 91 having at one end a cylindrical bore 92 containing a piston 93 axially movable in the bore. The bore 92 is engaged by a closure plug 94 to which conduit 90 is connected. Axial movement of the piston away from closure plug 94 is resisted by a spring 95 which surrounds a piston rod 96 to which the piston 93 is attached. The spring 95 normally maintains piston 93 in a position close to closure plug 94 in the normal operating condition of the valve.

The piston rod 96 extends axially through the central portion of the casing 91 and terminates at a disk 97 secured to the lower end of the piston rod inside a fluid chamber 98 within the lower portion of the casing. The disk 97 is of smaller diameter than the fluid chamber 98 so that reciprocating motion of the piston 93 displaces fluid in chamber 98 around the periphery of the disk. The piston rod is slidably supported by the central portion of the casing intermediate the fluid chamber 98 and the bore 92 is sealed to this portion of the casing by a ring seal 99. The fluid chamber 98 is closed by a threaded end plate 100 to which conduit 36 and conduit 81 are connected so that each may be closed by disk 97 when the piston rod is shifted downwardly to seat the disk against the end plate 100. Preferably the interior side of the end plate 100 is covered by a rubber lining 101.

Each time the vehicle brakes are applied, piston 93 is displaced to urge the disk 97 toward its closed position thereby restricting and eventually terminating the flow of fluid between conduits 36 and 81. As the flow is progressively restricted there is a proportional stiffening of the springs 15 and preferably when the brakes are fully applied, the valve 80 is fully closed so that the stiffness of the springs 15 is a function only of the characteristics of their rubber compounds and the geometry of the linkages connecting the springs with the wheels. The operation of valve 80 is somewhat similar to pinching the conduit 36 to block the flow of fluid when the brakes are applied. Other types of valves to restrict the flow may be used in place of valve 80 such as the valves commonly associated with shock absorbers for restricting the flow of hydraulic fluid.

The valve 80 may be actuated by other suitable fluid pressure generators. Alternatively, or in conjunction with its connection with the brake hydraulic system, it may be operated manually by an appropriate cable or other linkage (not shown) from the interior of the vehicle. In casing 55 of the elastic restraining means 40 of Fig. 3, a set of springs on opposite sides of piston 57 similar to the springs 87 and 88 of Fig. 7 may be included to supplement the operation of the yoke 70 and springs 69.

The static elevation between the frame of a vehicle and its wheel axles will be preferably established by design requirements and the springs 15, the cylinders 22 and the fluid pressure of the interconnecting conduits will be appropriately proportioned in a particular system to provide the desired elevation. When there is a material change in the mass of the sprung weight from this static or design condition, such as when several heavy passengers or other load is on the vehicle, the elevation-sensing mechanisms 45 associated with each spring function to adjust the pressure in the circuits so that the position of the frame of the vehicle relative to the axles is restored to the original or designed elevation to insure effective functioning of the hydraulic interconnecting circuits between the springs.

Structural details of a preferred elevation-sensing mechanism 45 are shown in Fig. 5 and include a casing 105 housing a central piston 106 with axially extending rods 107 and 108 projecting from opposite ends of the piston through the end walls of the casing. The rod 107 is connected to one end of tension coil spring 109 which is stretched to engage an arm 110 projecting from the outer shell 22 of its respective torsion spring 15. The other rod 108 is secured to a similar tension spring 112 which in turn is stretched to a portion of the frame 10. The casing 105 is secured to any convenient position of the frame. The springs 109 and 112 are of equal strength so that in a normal static position of the sensing mechanism these springs cooperate to maintain the central portion 113 of piston 106 in a position centrally of the casing closing the mouth of the conduit 42 connected to the casing. Flanking portion 113 are annular recesses 115 and 116 in the piston, the recess 115 communicating with the high pressure supply conduit 46 and the recess 116 communicating with the low pressure exhaust conduit 47 in the static position of the piston. Movement of the piston longitudinally in the casing will connect either the high pressure or the low pressure conduit with the conduit 42.

If a heavy static load is placed on the rear of a vehicle to urge the frame downward toward the rear axle, the outer shell 23 of each rear torsion spring 15 is rotated relative to the inner shaft in a direction equivalent to the rotation which is produced by swinging its arm 17 in Fig. 1 upwardly from the plane of the drawing. This annular displacement of the outer shell relieves the tension in spring 109 of the sensing mechanism 45 associated with the torsion spring 15 so that the opposing spring 112 shifts the piston 106 to bring the high pressure supply conduit 46 into communication with conduit 42 leading to the spring reaction cylinder 22. While the pressure of the fluid in the reaction cylinder will be increased by the added static load, fluid at a higher pressure will flow through the recess 115 into conduit 42 to raise piston 30 of the reaction cylinder 22, thereby swinging lever arm 28 of each spring upwardly. This movement rotates inner shaft 24 of the spring in a direction to raise or jack the rear corner of the vehicle and restore the frame to its initial level. The piston 106 of the sensing mechanism 45 is automatically restored by the springs 109 and 112 to its central position of Fig. 5 as soon as the initial level of the frame is restored.

Since each of the rear torsion springs is hydraulically interconnected with the corresponding front torsion springs, the influx of fluid through the sensing mechanism 45 into the interconnecting circuits produces an increase in pressure throughout the circuit and tends to produce a corresponding jacking action in each of the front springs. The latter is undesirable because it would result in the frame of the vehicle being higher in front than the desired elevation. This condition is avoided in this system, however, because when the outer shell 23 of a front spring 15 is rotated by the increase in pressure to jack the front corner of the frame, the piston 106 of the sensing mechanism 45 associated with the front spring is shifted so that its conduit 42 is in communication with its exhaust conduit 47. The added pressure in the front cylinder 22 is therefore relieved and the elevation of the front of the vehicle relative to the front axle remains unchanged while the rear portion of the frame is restored to its initial static elevation. Accordingly the resulting differential in load on the front and rear is accompanied by a difference in hydraulic pressure in the interconnecting circuits, and this difference is balanced by the springs 69 of Fig. 3, or the springs 87 and 88 of Fig. 7 as the case may be, depending on the type of elastic restraint used in the circuits.

If the static load is increased materially at the front of the vehicle, the operation of the sensing mechanisms 45 is the reverse of that described in the preceding paragraphs.

If the elevation of either end of the frame is changed momentarily such as might be caused by a bump in the road, the movement of the piston 106 will be retarded sufficiently to permit the system to return to its normally balanced condition before the piston 106 has moved to open the conduit 42. This is accomplished by filling the casing 105 at its opposite ends with an oil or other fluid of sufficient viscosity to offer resistance to flow through a passage 120 extending lengthwise through the piston. Thus when the spring 109 and 112 become unbalanced for an instant because of a momentary shock load, any substantial movement of the piston 106 is opposed by the resistance of the fluid at the opposite ends of piston to displacement through the passage 120. By appropriately adjusting the tension of the springs 109 and 112, and the size of the passage 120, any desired degree of sensitivity in operation of the mechanisms 45 may be obtained.

Variations in the structure disclosed may be made within the scope of the appended claims.

I claim:

1. A spring suspension system for a vehicle having a load-carrying frame, wheels and wheel-mounting means connected to the frame for movement of the wheels relative to the frame, the system comprising a spring engaged with each said wheel mounting means and an adjacent portion of said frame, a hydraulic circuit interconnecting the spring of one wheel with a spring of another wheel, said circuit comprising means responsive to deflection of either of said springs to communicate a proportion of the deflecting force to the other spring and arranged to deflect the latter oppositely to impart a leveling force to the portion of the frame adjacent the latter, and means interposed in said circuit for elastically resisting said communication of deflecting forces between said springs to resist pitching motion of the frame relative to the wheels, means operable in response to actuation of the braking system of the vehicle for providing increased resistance to the communication of deflecting forces between said wheel springs when the vehicle brakes are applied.

2. A spring suspension system in accordance with claim 1 which further includes means responsive to a material change in the static load imposed on the frame to maintain a predetermined elevation between said frame and said wheels.

3. In a vehicle having a frame and road wheels supported thereon spaced longitudinally of the frame, a spring engaged with each wheel and an adjacent portion of the frame, a spring-reaction cylinder associated with each spring, each cylinder including a piston connected to its respective spring and displaceable by deflection of its spring, a hydraulic liquid-filled conduit connected to each cylinder, the liquid in said conduit being displaceable in the conduit in response to movement of the piston of its respective cylinder, means for interconnecting said conduit from one spring-reaction cylinder with a corresponding conduit from another spring-reaction cylinder whereby deflection of one spring results in a corresponding opposite deflection in the spring to which the initially deflected spring is interconnected by said conduits and leveling force applied to said frame, spring-controlled means interposed in said conduits between their respective spring-reaction cylinders for elastically opposing displacement of liquid through said conduits in response to deflection of one of said springs, and means for selectively varying the orientation of the force-exerting axis of the spring controlling the latter said means to vary the resistance of the latter said means to the communication of deflecting forces between said wheel springs.

4. In a vehicle having a frame and a pair of road wheels supported thereon, a spring engaged with each wheel and an adjacent portion of the frame for resiliently supporting its respective wheel, a hydraulic liquid-filled conduit having one end terminating at each spring, a hydraulic liquid-filled casing to which the opposite end of each said conduit is connected, a piston movable axially in said casing intermediate the junctions of the respective conduits with the casing, means actuated by the deflection of one spring to displace said fluid in its respective conduit toward said casing to displace said piston, means responsive to said displacement of said piston to deflect the latter spring oppositely to the deflection of the spring initiating said movement and thereby imparting a frame-leveling force on the portion of the frame adjacent the latter spring, spring means elastically opposing said axial movement of the piston, and means for varying the mutual relation of the force-applying axis of said spring means with the displacement axis of said piston to vary the resistance of said spring means to said axial movement of the piston.

5. In a vehicle having a frame and a pair of road wheels supported thereon, a spring engaged with each wheel and an adjacent portion of the frame for resiliently supporting its respective wheel, a hydraulic liquid-filled conduit having one end terminating at one spring, a liquid-filled casing to which the opposite end of said conduit is connected, a piston movable axially in said casing, means actuated by deflection of the spring to which said conduit is connected to displace said fluid in said conduit against said piston to displace said piston in said casing, means actuated by said displacement of said piston to deflect the latter spring oppositely to the deflection of the spring initiating said movement and thereby imparting a frame-leveling force on the portion of the frame adjacent the latter spring, spring means elastically resisting said axial movement of the piston, and means operable in response to actuation of the braking system of the vehicle to increase the resistance of said spring means to said axial movement of said piston when the vehicle brakes are applied.

6. The structure of claim 5 which further includes means engaged with each said wheel spring and said frame and operable in response to a material change in the static deflection of one of said wheel springs to restore each said wheel spring to a predetermined static deflection.

7. In a vehicle having a frame and a pair of road wheels supported thereon, a spring engaged with each wheel and an adjacent portion of the frame for resiliently supporting its respective wheel, a hydraulic liquid-filled conduit having one end terminating at one spring, a liquid-filled casing to which the opposite end of said conduit is connected, a piston movable axially in said casing, means actuated by deflection of the spring to which said conduit is connected to displace said fluid in said conduit against said piston to displace said piston in said casing, means actuated by said displacement of said piston to deflect the latter spring oppositely to the deflection of the spring initiating said movement and thereby imparting a frame-leveling force on the portion of the frame adjacent the latter spring, a rod extending axially from said piston, a yoke pivotally supported adjacent a portion of said rod for swivel movement relative to said rod, a pair of springs each connected to said rod and to said yoke to exert opposing forces on said rod resisting reciprocation of said rod, and means for moving said yoke swivelly relative to the rod to vary the direction of the forces exerted on said rod by said springs to regulate the resistance of said springs to said reciprocation of the rod.

8. In a vehicle having a frame and a pair of road wheels supported thereon, a spring engaged with each wheel and an adjacent portion of the frame for resiliently supporting its respective wheels, a hydraulic liquid-filled conduit having one end terminating at one spring, a liquid-filled casing to which the opposite end of said conduit is connected, a piston movable axially in said casing, means actuated by deflection of the spring to which said conduit is connected to displace said fluid in said conduit against said piston to displace said piston in said casing, means actuated by said displacement of said piston to deflect the latter spring oppositely to the deflection of the spring initiating said movement and thereby imparting a frame-leveling force on the portion of the frame adjacent the latter spring, spring means elastically resisting said axial movement of the piston, and valve means in said conduit for selectively impeding the flow of liquid displaced into said casing.

9. In a vehicle having a frame and a pair of road wheels supported in longitudinal spaced relation on the frame, a torsion spring engaged with each wheel and an adjacent portion of the frame for resiliently supporting its respective wheel, a spring-reaction cylinder secured to the frame adjacent each spring and having a piston therein, means connecting each spring with the piston of its respective spring-reaction cylinder and operable to displace said piston in response to deflection of said spring, a hydraulic liquid-filled conduit having one end terminating at each said spring-reaction cylinder, a hydraulic liquid-filled casing to which the opposite end of each said conduit is connected, a piston in said casing intermediate the junctions of said conduits with the casing and axially movable in response to displacement of fluid in one of said conduits resulting from deflection of its respective spring, means for elastically resisting said movement of the piston of said casing, means for varying the elastic resistance of the latter said means, and means operable in response to a material change in the static deflection of one of said torsion springs to vary the volume of liquid in the spring-reaction cylinder of said spring proportionally to said change in deflection to restore each said torsion spring to a predetermined static deflection.

10. In a vehicle having a frame and a pair of road wheels supported in longitudinal spaced relation on the frame, a torsion spring engaged with each wheel and an adjacent portion of the frame for resiliently supporting its respective wheel, a spring-reaction cylinder secured to the frame adjacent each spring and having a piston therein, means connecting each spring with the piston of its respective spring-reaction cylinder and operable to displace said piston in response to deflection of said spring, a hydraulic liquid-filled conduit having one end terminating at each said spring-reaction cylinder, a hydraulic liquid-filled casing to which the opposite end of each said conduit is connected, a piston in said casing intermediate the junctions of said conduits with the casing and axially movable in response to displacement of fluid in one of said conduits resulting from deflection of its respective spring, a rod extending axially from said piston, a yoke pivotally supported adjacent a portion of said rod for swivel movement relative to said rod and having a pair of legs disposed on opposite sides of the rod between which legs the rod is reciprocable, a pair of tension springs each connected with said rod and one of said pair of legs of said yoke to exert opposing forces on said rod resisting reciprocation of said rod, said yoke being normally oriented with said springs substantially perpendicular to said rod and being movable swivelly to re-orient the springs to non-perpendicular coplanar positions relative to the rod to regulate the resistance of said springs to said reciprocation of the rod, and means operable in response to a material change in the static deflection of one of said torsion springs to vary the volume of liquid in the spring-reaction cylinder of said spring proportionally to said change in deflection to restore each said torsion spring to a predetermined static deflection.

11. A spring suspension system for a vehicle having a load-carrying frame, wheels and wheel-mounting means connected to the frame for movement of the wheels relative to the frame, the suspension system comprising a spring engaged with each said wheel-mounting means and an adjacent portion of said frame, means hydraulically interconnecting the spring of one wheel with a spring of another wheel, said hydraulic means being responsive to deflection of one of said springs to communicate a proportion of the deflecting force to the other spring and to deflect the latter spring oppositely to impart a leveling force to the portion of the frame adjacent the latter, said hydraulic means including spring means for elastically resisting said communication of deflecting forces between said springs to resist pitching motion of the frame relative to the wheels, and means operable in response to a rate of change of speed of the vehicle for increasing the resistance of said spring means to the communication of deflecting forces between said wheel springs.

12. A spring suspension system for a vehicle having a load-carrying frame, wheels and wheel-mounting means connected to the frame for movement of the wheels relative to the frame, the system comprising a spring engaged with each said wheel-mounting means and an adjacent portion of said frame, a hydraulic circuit interconnecting the spring of one wheel with a spring of another wheel, said circuit comprising means responsive to deflection of either of said springs to communicate a proportion of the deflecting force to the other spring and arranged to deflect the latter oppositely to impart a leveling force to the portion of the frame adjacent the latter, spring-controlled means interposed in said circuit for elastically resisting communication of deflecting forces between said springs to resist pitching motion of the frame relative to the wheels, and means for selectively varying the orientation of the force-exerting axis of the spring of the latter said means to vary the resistance of said spring-controlled means to the communication of deflecting forces between said wheel springs.

13. A spring suspension system for a vehicle having a load-carrying frame, wheels and wheel-mounting means connected to the frame for movement of the wheels relative to the frame, the system comprising a spring engaged with each said wheel mounting means and an adjacent portion of said frame, a hydraulic circuit interconnecting the spring of one wheel with the spring of another wheel, said circuit comprising means responsive to deflection of either of said springs to communicate a proportion of the deflecting force to the other spring and arranged to deflect the latter oppositely to impart a leveling force to the portion of the frame adjacent the latter, means interposed in said circuit for elastically resisting the communication of deflecting forces to resist pitching motion of the frame relative to the wheels, and means for increasing resistance to the communication of deflecting of forces between said wheel springs proportionally to deceleration of the vehicle.

References Cited in the file of this patent
UNITED STATES PATENTS

| 1,601,939 | Carroll | Oct. 5, 1926 |
| 1,947,337 | Fageol | Feb. 13, 1934 |
| 1,976,951 | Lombard | Oct. 16, 1934 |
| 2,003,511 | Mercier | June 4, 1935 |
| 2,555,649 | Krotz | June 5, 1951 |
| 2,788,222 | Wilson | Apr. 9, 1957 |